United States Patent Office 3,623,843
Patented Nov. 30, 1971

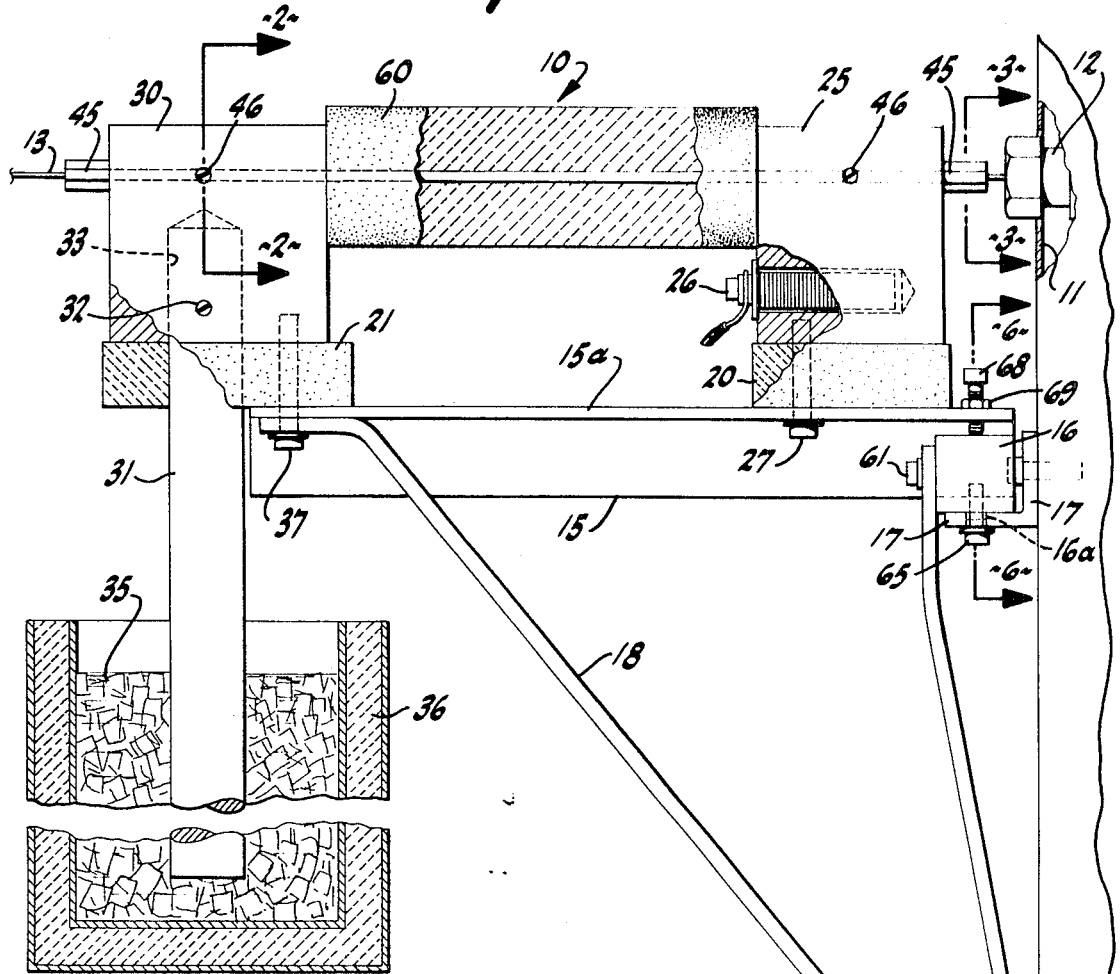

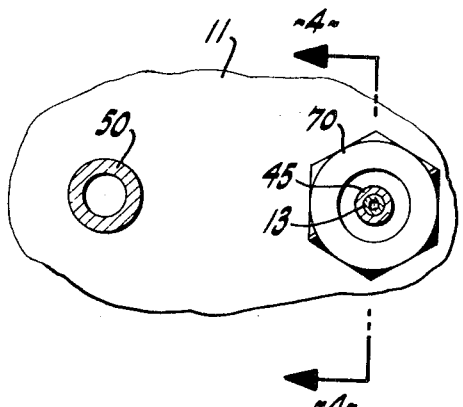
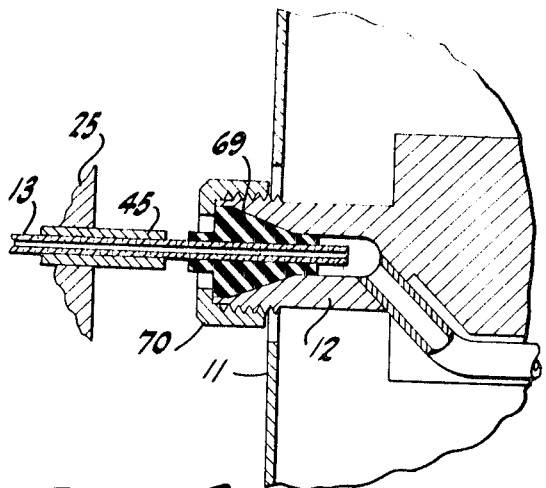
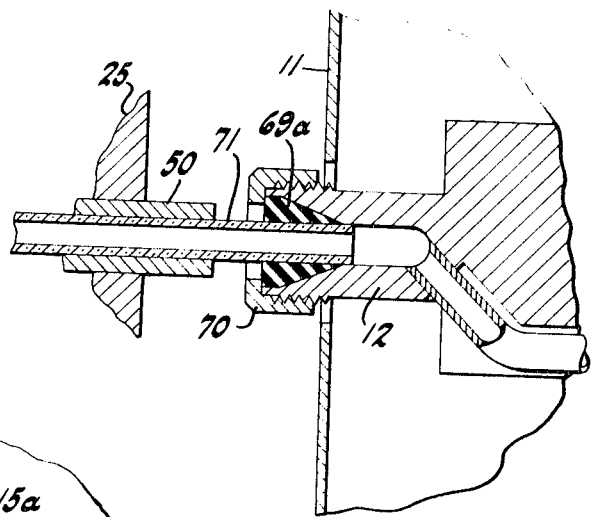
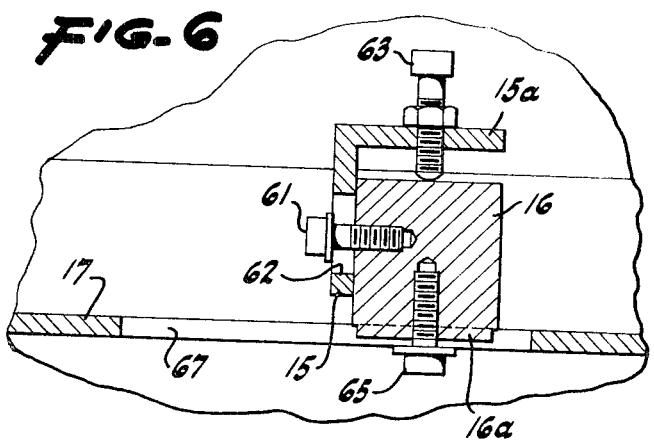

3,623,843
APPARATUS FOR CONDENSING ORGANIC VAPORS OF GAS CHROMATOGRAPHIC FRACTIONS
Robert G. Brownlee, East Palo Alto, Calif., assignor to Stanford Research Institute, Menlo Park, Calif.
Filed Sept. 10, 1969, Ser. No. 856,712
Int. Cl. B01n
U.S. Cl. 23—252
3 Claims

ABSTRACT OF THE DISCLOSURE

Apparatus for condensing and collecting microgram and larger amounts of organic vapors present in a gas chromatography effluent without engendering fog droplets. The apparatus comprises a length of small aluminum tubing adapted to receive an open-ended capillary or other glass tube into which the gas sample is passed for condensation, said aluminum tube being mounted at the sample receiving end in a heated aluminum block and, at the other end, in a refrigerated aluminum block spaced from the heated block, and with the intervening length of tubing between the blocks being thermally insulated so as to provide an even temperature gradient along said length ranging from vaporization to condensation temperatures. The organic vapors present in the sample directed into the glass tube are condensed therein, while any inert carrier components thereof are discharged from the open, downstream end of the tube.

BACKGROUND OF THE INVENTION

In condensing hot organic vapors from a gas stream wherein said vapors are carried by an inert gas such as helium, for example, the vapors have a tendency to condense in fog-like droplets as the gas is cooled by conventional heat exchange devices, thus making it extremely difficult to bring the condensate together in a liquid or solid mass. This difficulty is particularly prevalent when dealing with relatively small gas volumes such as those discharged as a gas chromatography effluent which carries only microgram amounts of condensable vapors.

It is an object of the present invention to provide a collection device for condensing gas chromatography and other effluents in an efficient manner and without the production of particulate droplets collectively referred to as a fog. A more particular object is to collect the sample in a length of capillary or other glass tubing which can readily be sealed at both ends, thus enclosing the sample, once the desired condensation of organic materials present in the effluent is complete. Still another object is to provide an apparatus which is adapted to receive collection tubes of varying size and thus to accommodate incoming effluent gas streams of varying magnitude and condensable vapor content.

SUMMARY OF THE INVENTION

It has been discovered that the foregoing and other objects of the invention can be attained by the provision of a collection device which incorporates a length of metal tubing composed of aluminum or other good heat conductive metal adapted to receive a glass sample collection tube in good heat transfer relationship and along the length of which can be established a linear thermal gradient ranging from vaporization to condensation temperatures as regards any given vapor sample. This is accomplished by mounting the metal tube at the gas receiving end within a block to which heat is supplied, as by a cartridge heater, or the like, while the other end of the metal tube is mounted within a refrigerated block spaced some distance downstream from the heated block, the space between the blocks being wrapped with a thermally insulating material. If desired, a plurality of metal tubes of varying size can be mounted in parallel relationship to one another in this fashion between said cooled and heated blocks, with each of the tubes being adapted to receive a length of sample-receiving glass tubing having an external diameter such that it will engage the metal tubing in good heat exchange relationship. This plural-tube construction is preferred, and the invention will hereinafter be described in terms of this embodiment.

In operation, the condensable portion of the sample stream is condensed on the walls of the glass tubing, while any carrier gas present in the sample merely passes through the tube and on out of the apparatus. The condensate-containing glass tube can then be withdrawn from the apparatus and closed by fusing the ends of the tubing, if so desired.

The device of the present invention is adapted to be mounted on the vertical wall of an instrument through which is supplied the vapor stream to be condensed. So mounted, the tubular elements of the apparatus are maintained perpendicular to the instrument wall in a horizontal position with provision being made to effect both vertical and lateral adjustment of the tubes so as to bring the same into alignment with the exit port in the wall of the gas chromatograph or other instrument supplying the sample.

The heated block of the present apparatus is maintained by a cartridge heater or the like at temperatures sufficiently high to ensure that the sample passing through the tubular portion within said block is in the vaporous condition. This is facilitated by fabricating the block of aluminum, copper, silver, brass or other metal of good heat conductivity. Aluminum, being relatively light, cheap and readily machineable, is the preferred material of construction for the heated block as well as for the refrigerated block and the lengths of connecting metal tubing which encloses the sample-receiving glass tube. Refrigeration of the distal block is effected by connecting the same with a heavy metal rod of good heat conductivity, again preferably of aluminum fabrication, which is adapted to be inserted in a pool of a cold liquid such as liquid nitrogen or liquid carbon dioxide.

The respective heated and refrigerated blocks of the apparatus are spaced from one another by an appreciable length of the thermally insulated metal tubing element arranged to receive the sample-receiving glass tubes. Thus, good results can be obtained when said length ranges from at least about 3 inches to 12 inches, or even more, with a preferred tubing length between the blocks ranging from about 4 to 10 inches. Such lengths provide an even temperature gradient having a slope which is not so precipitous as to result in poor sample recovery. Thus, under optimum conditions the present apparatus permits of the recovery of at least 90% of the condensable vapors present in gas samples containing only microgram amounts of a condensable component at representative flow rates which are typically between about 25 and 50 cc./min. The choice of coolant and gas flow rate will depend somewhat on the boiling point or the melting point of the condensate, as well as on its viscosity.

DESCRIPTION OF PREFERRED EMBODIMENTS

For a better understanding of the present invention, reference is had to the following specific description when read in conjunction with the figures of the accompanying drawings wherein:

FIG. 1 is an elevational view, partially in section, of an apparatus for condensing organic vapors embodying features of this invention;

FIG. 2 is an enlarged sectional view taken along line 2—2 of FIG. 1;

FIG. 3 is an enlarged sectional view taken along line 3—3 of FIG. 1;

FIG. 4 is a sectional view taken along line 4—4 of the FIG. 3;

FIG. 5 is a view similar to that of FIG. 4, but showing the apparatus connected to the gas supply source through the larger of the two alternative vapor condensation tubes; and FIG. 6 is a sectional view taken along the line 6—6 of FIG. 1.

Referring more particularly to FIG. 1, there is generally shown at 10 a vapor collection apparatus of the present invention which is mounted on a vertical wall 11 of an instrument from which is discharged, through fitting 12, the vapor sample to be collected by the present apparatus. In the embodiment here illustrated, the vapors are shown as being directed into a glass tube 13, this being the smaller of two glass tubes which can be fitted into the apparatus for alternative use. The apparatus incorporates an angular frame member 15 having a top, horizontal flange portion 15a which supports the remaining portions of the unit, and to effect mounting of the apparatus on instrument wall 11 the frame member 15 is secured to a block 16 which is slidably mounted on a horizontal bracket 17 secured to wall 11 below the vapor exit fitting 12 provided therein. A U-shaped supporting bracket 18 serves to maintain the frame member 15 in a horizontal position, the bottom of said bracket having an adjustable bushing 19 which rides against wall 11, while the arms of bracket 18 are connected to the distal end of the frame member 15 and to block 16 respectively.

Mounted on the portion 15a of the frame member are asbestos insulating pads 20 and 21 which thermally insulate the other portions of the apparatus from the supporting structure, pad 20 and block 25 being secured to the frame member by means of a screw 27. Pad 21, mounted on the forward or distal end of flange 15a so as to project beyond the end thereof, carries a solid aluminum block 30 fitted with a depending aluminum rod 31 the upper end of which is secured by a screw 32 within a bore 33 cut in the underside of block 30. Rod 31 passes downwardly through an opening in the insulating pad 21, and the lower end of the rod is adapted to be refrigerated and thus carry heat away from block 30 as the rod is set within a cooling bath such as the acetone-solid carbon dioxide mass shown at 35, as contained within an open insulating vessel 36 which can be supported in any convenient fashion. Pad 21 and block 30 are secured to the member 15a by means of a screw 37 which also serves to hold the outward supporting arm of bracket 18.

As more particularly shown in FIG. 2, the aluminum block 30, cooled by its received rod 31, is provided with aligned horizontal bores 40 and 41 of differing diameter, said bores, in turn, being aligned with similar bores cut through the heated aluminum block 25. A length of aluminum tube 45 is slidably received in good heat transfer relationship within the bores 40 cut in the two aluminum blocks, said tube projecting a short distance beyond the outer end of each block in the embodiment here illustrated, and being secured against movement within the blocks by means of the screws 46. As shown in FIGS. 2, 3 and 5, a somewhat larger aluminum tube member 50 running parallel to tube 45 is set within the larger bores 41 in a similar fashion and is secured by set screws 51. This tube is adapted to receive a glass sample collection tube 53, as shown in FIG. 5, which is somewhat larger than the glass tube 13 which is of a capillary size.

The intervening length of the tube members 45 and 50 which bridges blocks 25 and 30 is wrapped with a blanket 60 of a fiberglass insulating material both surfaces of which have been faced with aluminum foil. This blanket can be secured in its wrapped position with a glass tape (not shown) or by other convenient means.

Referring now to FIGS. 1 and 6, it will be seen that frame member 15 is secured to block 16 by a set screw 61 the shank portion of which passes through a vertical slot 62 cut in said frame member for threaded engagement in said block. The loosening and tightening of this screw, while at the same time making an appropriate adjustment in the position of the stop screw 63 threaded through flange 15a, permits the member 15 to be raised or lowered with reference to block 16 so as to bring the tubes 45 and 50 carried thereon, together with their contained glass collection tubes, into horizontal registry with the gas exit port 12.

Block 16, to which frame member 15 is secured, rides along the bracket 17 secured to the instrument wall 11 and can be set in any position of adjustment thereon, as required to effect vertical alignment of the tubes with the port 12, by the loosening and tightening of set screw 65. The shank portion of this screw passes through a tongue 16a carried by block 16 which slides in a longitudinal slot 61 cut in bracket 17, thereby permitting the desired degree of horizontal displacement of the block to be made without allowing the block to turn on its vertical axis.

Once the metal tubes 45 or 50 have been brought into proper registry with port 12, the glass sample collection tube can be slid through the apparatus from the distal end for connection with the fitting of the gas exit port 12. This connection can be made by any appropriate means such, for example, as those illustrated in FIGS. 4 and 5 hereof. Referring first to FIG. 4 which shows the smaller glass tube 13 connected to the exit port, it will be noted that the projecting end of the glass tube is fitted with a suitable bushing 69 composed of Teflon or the like, said bushing having a conical surface which fits against a mating surface within the fitting of exit port 12. By turning a nut 70 about the threaded outer portion of this fitting, the bushing becomes tightly compressed against the glass tube, thereby making the desired gas-tight connection. In the form of bushing illustrated in FIG. 4, the forward margin thereof is provided with an annular shank portion so as to maximize the area of contact between the bushing and the glass. In the form of device illustrated in FIG. 5, which shows a larger glass tube 71 being connected with the exit port, the construction is very much the same except that here the bushing member 69a employed has no corresponding forward shank portion.

In using the collection device of the present invention once the connection with the gas discharge port and the glass receiving tube has been made, the temperature of block 25 is brought to a temperature sufficiently high to maintain the admitted gas sample in the vapor state, while block 30 is cooled to a temperature well below that required to condense any condensable vapors present in the sample gas. The sample gas stream is then admitted to the apparatus where condensate collects on the inner wall of the glass tube, with the helium, nitrogen or any other carrier gases present in the stream being discharged through the open end of the glass tube adjacent the cold block. If desired, a small length of Teflon tubing can be fitted over the projecting end of the metal tube so as to prevent the collection of frost on said tube, thereby avoiding contamination of the glass tube which is inserted through this end of the metal tube.

Although the present invention has been described with respect to particular preferred embodiments thereof, it is not intended to limit the invention to the details of description and illustration. Reference is made to the appended claims for a precise definition of the invention.

I claim:

1. A device for condensing gas vapors, said device comprising a straight, thermally conductive, open-ended metal tube; an open-ended glass vapor collection tube slidably mounted within the said metal tube; a first block of a thermally conductive metal provided with a horizontal bore within which said metal tube is mounted in good heat transfer relationship at one extremity thereof; a second block of a thermally conductive metal provided with a horizontal bore aligned with that in said first block and within which said metal tube is mounted in good heat transfer relationship at its other extremity, the said blocks being separated from one another by a substantial intervening length of the connecting metal tube; means for heating the first block; a depending thermally conductive metal rod connected with the second block and depending therefrom, said rod being adapted to be set within a refrigerating bath and thereby conduct heat away from the connected block; and a thermal insulating material enclosing the metal tube over said intervening length whereby a linear temperature gradient can be established and maintained along said insulated tube length as the one block is heated and the other block is cooled.

2. The device of claim 1 wherein the said blocks are mounted on but thermally insulated from a common frame member running parallel with the metal tube, said frame member being adapted to be horizontally mounted adjacent a vertical instrument wall in a position such that the metal tube and the glass collection tube therein are aligned with an exit port in said wall through which are passed the gas vapors to be condensed.

3. The device as recited in claim 2 wherein the blocks are provided with a second set of aligned bores paralleling the recited bores but having a diameter differing therefrom; a second thermally conductive metal tube having a diameter differing from that of the recited metal tube, said second metal tube having its respective extremities mounted within said second set of bores and being adapted to slidably receive within its bore an open-ended glass collection tube of appropriate diameter; and means associated with the frame member for adjustably mounting the device adjacent the instrument wall whereby either metal tube and its contained glass collection tube can be brought into a position of alignment with the gas vapor exit port in said wall.

References Cited

UNITED STATES PATENTS

| | | | |
|---|---|---|---|
| 960,542 | 6/1910 | Hamlin | 202—186 |
| 3,050,449 | 8/1962 | Moore | 203—49 |
| 3,273,969 | 9/1966 | Sirgo | 23—294 |

FOREIGN PATENTS 786,818 11/1957 Great Britain.

OTHER REFERENCES

Napier et al., Chem. & Ind., 1958, pp. 1319.
Drew et al., J. Chromatography, 9, pp. 264–66 (1962).
Shearer et al., Analyst, 88, pp. 147–49 (1963).
Smouse et al., J. Chromatography, 13, pp. 244–46 (1964).

NORMAN YUDKOFF, Primary Examiner

R. T. FOSTER, Assistant Examiner

U.S. Cl. X.R.

55—82; 62—42